United States Patent
Yoshida

(10) Patent No.: US 8,576,480 B2
(45) Date of Patent: Nov. 5, 2013

(54) OPTICAL AMPLIFIER AND AN OPTICAL AMPLIFICATION METHOD

(75) Inventor: Hideshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/491,059

(22) Filed: Jun. 7, 2012

(65) Prior Publication Data

US 2012/0314278 A1    Dec. 13, 2012

(30) Foreign Application Priority Data

Jun. 8, 2011 (JP) ................................ 2011-127946

(51) Int. Cl.
- H04B 10/079    (2013.01)
- H04B 10/296    (2013.01)
- H01S 3/10      (2006.01)
- H01S 3/131     (2006.01)
- G02B 6/34      (2006.01)

(52) U.S. Cl.
CPC ........ H04B 10/07957 (2013.01); H04B 10/296 (2013.01); H01S 3/10015 (2013.01); H01S 3/1312 (2013.01); G02B 6/34 (2013.01)
USPC ............ 359/341.43; 398/33; 398/34; 398/86; 398/177; 398/180; 385/25; 385/36

(58) Field of Classification Search
CPC ............ H04B 10/07957; H04B 10/296; H01S 3/10015; H01S 3/1312; G02B 6/34
USPC ................. 359/341.43; 398/34, 86, 177, 180; 385/25, 26, 36
See application file for complete search history.

(56) References Cited

U.S. PATENT DOCUMENTS

| | | | | |
|---|---|---|---|---|
| 3,610,727 A | * | 10/1971 | Ulrich | 372/108 |
| 5,119,452 A | * | 6/1992  | Yokomori et al. | 385/36 |
| 5,513,287 A | * | 4/1996  | Talbot et al. | 385/25 |
| 5,699,081 A | * | 12/1997 | Denkin et al. | 359/337.12 |
| 5,850,302 A | * | 12/1998 | Strasser et al. | 398/93 |
| 5,980,831 A | * | 11/1999 | Braiman et al. | 422/82.11 |
| 6,049,415 A | * | 4/2000  | Grubb et al. | 359/341.1 |
| 6,137,605 A | * | 10/2000 | Watanabe | 398/1 |
| 6,330,388 B1 | * | 12/2001 | Bendett et al. | 385/132 |
| 6,360,038 B1 | * | 3/2002  | Grubsky | 385/28 |
| 6,407,854 B1 | * | 6/2002  | Shum | 359/341.41 |
| 6,433,920 B1 | * | 8/2002  | Welch et al. | 359/334 |

(Continued)

FOREIGN PATENT DOCUMENTS

JP    8-335913 A    12/1996

*Primary Examiner* — Mark Hellner
*Assistant Examiner* — Ari M Diacou
(74) *Attorney, Agent, or Firm* — Sughrue Mion, PLLC

(57) ABSTRACT

An optical amplifier using the evanescent light to control the optical output level is provided. The optical amplifier includes: a waveguide path transmitting an optical signal; an optical amplification unit formed on the waveguide path and amplifying the optical signal by an excitation light; an irradiation unit irradiating the excitation light to the optical amplification unit; an optical detection unit generating an electric signal which corresponds to a detected light; a branching unit branching an evanescent light being the optical signal outputted from the optical amplification unit and leaked outside the waveguide path, and focusing the evanescent light on the optical detection unit; a wavelength detection unit detecting a wavelength multiplicity of the optical signal based on the detected evanescent light; and a light amount adjustment unit adjusting a light amount of the excitation light irradiated by the irradiation unit based on the wavelength multiplicity.

7 Claims, 5 Drawing Sheets

(56) References Cited

U.S. PATENT DOCUMENTS

| | | | |
|---|---|---|---|
| 6,483,629 B1* | 11/2002 | Boffi et al. | 359/336 |
| 6,529,318 B1* | 3/2003 | Kaneda et al. | 359/341.32 |
| 6,603,595 B2* | 8/2003 | Welch et al. | 359/334 |
| 6,850,665 B2* | 2/2005 | Grubsky et al. | 385/28 |
| 7,184,206 B2* | 2/2007 | Chen et al. | 359/341.1 |
| 7,260,279 B2* | 8/2007 | Gunn et al. | 385/2 |
| 7,518,764 B2* | 4/2009 | Osborne et al. | 358/481 |
| 7,706,060 B2* | 4/2010 | Mogami et al. | 359/388 |
| 8,139,288 B2* | 3/2012 | Osborne et al. | 359/385 |
| 2002/0021765 A1* | 2/2002 | Maleki et al. | 375/300 |
| 2003/0012246 A1* | 1/2003 | Klimek et al. | 372/70 |
| 2005/0057798 A1* | 3/2005 | Osborne et al. | 359/368 |
| 2006/0193555 A1* | 8/2006 | Schilling et al. | 385/25 |
| 2006/0257886 A1* | 11/2006 | Kobayashi et al. | 435/6 |
| 2006/0280404 A1* | 12/2006 | Kennedy et al. | 385/31 |
| 2007/0086782 A1* | 4/2007 | Schilling et al. | 398/141 |
| 2007/0223553 A1* | 9/2007 | Liu | 372/70 |
| 2009/0052021 A1* | 2/2009 | Mogami et al. | 359/385 |
| 2009/0168061 A1* | 7/2009 | Haga et al. | 356/317 |
| 2009/0237670 A1* | 9/2009 | Osborne et al. | 356/445 |

* cited by examiner

OPTICAL AMPLIFIER AND AN OPTICAL AMPLIFICATION METHOD

INCORPORATION BY REFERENCE

This Patent Application is based on Japanese Patent Application No. 2011-127946 filed on Jun. 8, 2011. The disclosure of the Japanese Patent Application is incorporated herein by reference.

BACKGROUND OF THE INVENTION

1. Field of the Invention

The present invention relates to an optical amplifier. Specifically, the present invention relates to an optical amplifier which uses the evanescent light for controlling an optical output level.

2. Description of Related Art

Information communication systems which convert data into an optical signal, use an optical fiber as a transmission path for sending and receiving data are in widespread use. A transmission path using an optical fiber has advantages in signal attenuation amount and a communication capacity comparing with a case where data is sent and received as electric signals.

In a transmission path using an optical fiber, to increase a communication capacity further, the optical wavelength division multiplexing (WDM) communication system is used. The optical wavelength division multiplexing communication system is a communication system for increasing the communication capacity by sending optical signals of different wavelengths simultaneously via a single optical fiber. Further, though the signal attenuation amount is small in the optical communication comparing with the case of sending and receiving data by an electric signal, for communicating through a large distance, an amplification of the optical signal is required at a specific interval. In the amplification of the optical signal, the optical output level of an optical amplifier is required to be controlled to be a constant level. For controlling the optical output level, the following equation is used.

$$Palc[dBm] = Pch[dBm] \times (10 \times \log(Nch))$$ [EQUATION 1]

In the above equation, Pch [dBm] is a target value of the optical output level per 1 channel and is able to be determined to be desirable value by the designer. Nch is the channel number (multiplicity of wavelengths) of the signal light and means the number of wavelengths included in a multiplexed signal light. Palc [dBm] is a control target value of the optical output level, and to determine Palc [dBm], the detection of the channel number is required as represented in the above equation.

In Japanese Patent Application Publication JP 1996-335913A, an invention of an optical amplification monitoring device is disclosed, which detects the number of signal lights by using an inter-modulation light occurring in a case where signal lights of different wavelengths exist. In the invention disclosed in JP 1996-335913A, an exemplary embodiment is disclosed, in which the inter-modulation light is branched by a branching coupler and detected by a photodiode. Further, an exemplary embodiment is disclosed, in which only the inter-modulation light is extracted by reflecting and removing the signal light by an optical fiber grating, and the extracted inter-modulation light is detected by a photodiode.

SUMMARY OF THE INVENTION

An object of the present invention is to provide an optical amplifier which can control an optical output level thereof by using the evanescent light leaked to outside the waveguide path.

According to an aspect of the present invention, an optical amplifier includes: a waveguide path configured to transmit an optical signal; an optical amplification unit formed on the waveguide path and configured to amplify the optical signal by an excitation light; an irradiation unit configured to irradiate the excitation light to the optical amplification unit; an optical detection unit configured to detect a light and generate an electric signal which corresponds to the detected light; a branching unit configured to branch an evanescent light being the optical signal outputted from the optical amplification unit to the waveguide path and leaked outside the waveguide path, and focus the evanescent light on the optical detection unit; a wavelength detection unit configured to detect a wavelength multiplicity of the optical signal based on the evanescent light detected by the optical detection unit; and a light amount adjustment unit configured to adjust a light amount of the excitation light irradiated by the irradiation unit based on the wavelength multiplicity.

According to another aspect of the present invention, an optical amplifying method includes: amplifying an optical signal which transmits through a waveguide path by an excitation light by an optical amplification unit formed on the waveguide path; irradiating the excitation light to the optical amplification unit; detecting a light and generate an electric signal which corresponds to the detected light by an optical detection unit; branching an evanescent light being the optical signal outputted from the optical amplification unit to the waveguide path and leaked outside the waveguide path; focusing the evanescent light on the optical detection unit; detecting a wavelength multiplicity of the optical signal based on the evanescent light detected by the optical detection unit; and adjusting a light amount of the excitation light irradiated by the irradiation unit based on the wavelength multiplicity.

According to an aspect of the present invention, an optical amplifier which controls an optical output level thereof can be provided by using the evanescent light leaked to outside a waveguide path.

BRIEF DESCRIPTION OF THE DRAWINGS

The above and other objects, advantages and features of the present invention will be more apparent from the following description of certain preferred exemplary embodiments taken in conjunction with the accompanying drawings, in which.

DESCRIPTION OF THE PREFERRED EMBODIMENTS

Optical amplifiers 1 according to some exemplary embodiments of the present invention are explained below with reference to the accompanying drawings.

First Exemplary Embodiment
Explanation of Structure

Figure 1:
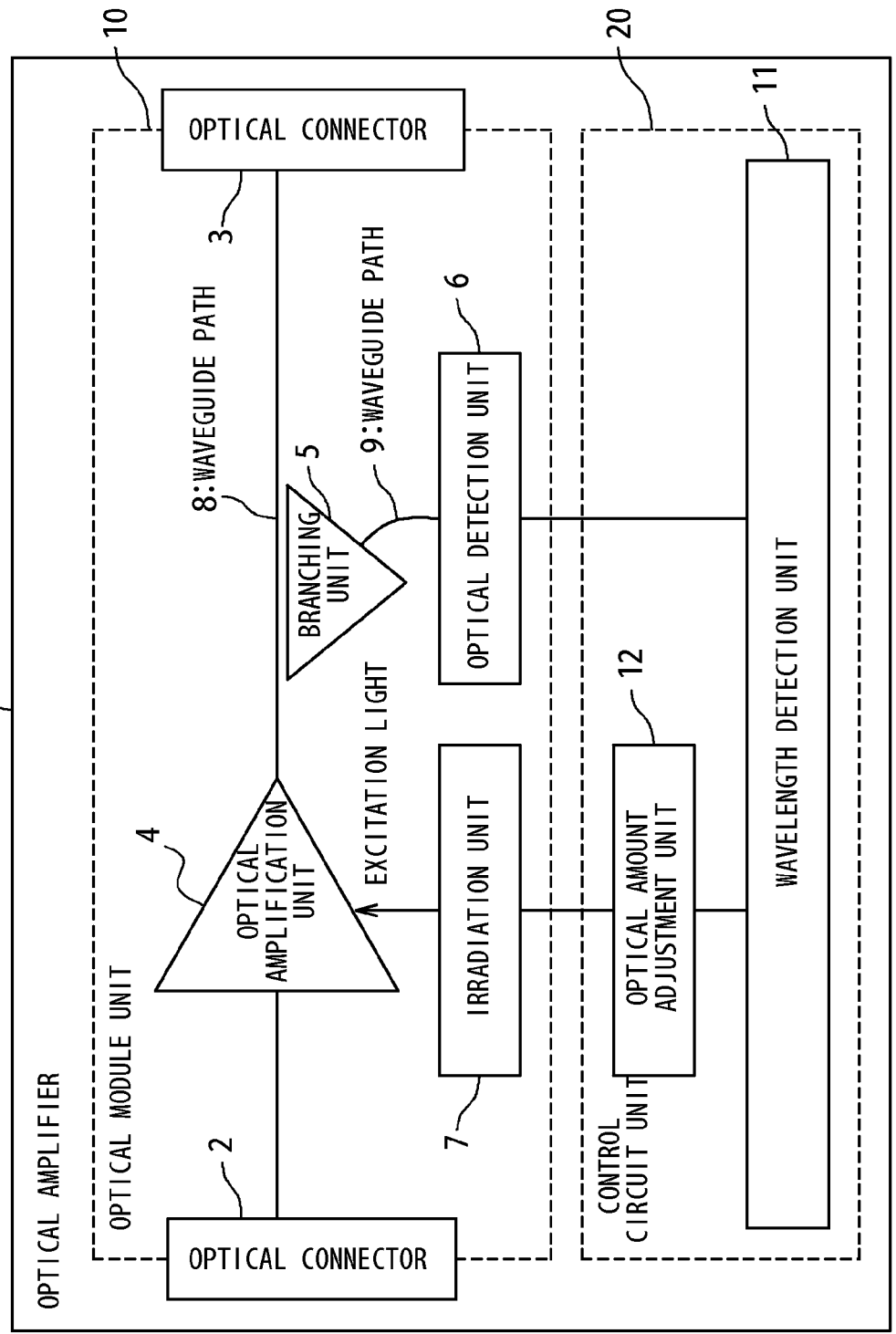
FIG. 1 is a structural view of an optical amplifier 1 according to a first exemplary embodiment of the present invention.

At first, a structure of an optical amplifier 1 according to the present exemplary embodiment is explained. FIG. 1 is a structural view of the optical amplifier 1 according to a first exemplary embodiment of the present invention. The optical amplifier 1 according to the present exemplary embodiment includes an optical module unit 10 and a control circuit unit 20. The optical module unit 10 includes: an optical connector 2; an optical connector 3; an optical amplification unit 4; a branching unit 5; an optical detection unit 6; an irradiation unit 7; a waveguide path 8; and a waveguide path 9. The control circuit unit 20 includes an optical detection unit 11 and an optical amount adjustment unit 12.

The optical connector 2 is an interface for inputting a signal light to the optical amplifier 1. The optical connector 3 is an interface for outputting the signal light amplified by the optical amplification unit 4. The optical amplification unit 4 amplifies a light signal by the induced emission caused by the excitation light. As the optical amplification unit 4, for example, an Erbium-doped fiber (EDF) can be adopted. When an excitation light is irradiated from the irradiation unit 7 to the Erbium-doped fiber, the energy state of Erbium becomes an excited state, and the signal light is amplified by the induced emission. The branching unit 5 detects an evanescent light being leaked from the waveguide path 8 through which the signal light outputted from the optical amplification unit 4 is transmitted. The evanescent light has a same wavelength with the signal light so that the wavelengths included in the signal light can be detected by the branching unit 5. As the branching unit 5, for example, a prism can be adopted. However, any optical elements which are able to detect the evanescent light (for example, a diffraction grating) can be adopted as the branching unit 5. The optical detection unit 6 detects wavelength components of the signal light outputted from the branching unit 5. As the optical detection unit 6, for example, a photodiode can be adopted. The irradiation unit 7 irradiates an excitation light to the optical amplification unit 4. As the irradiation unit 7, for example, a laser-diode can be adopted. The waveguide path 8 is a transmission path for transmitting a signal light. As the waveguide path 8, for example, an optical fiber can be adopted.

The wavelength detection unit 11 detects the wavelengths detected by the optical detection unit 6 and counts the number of wavelengths. The optical amount adjustment unit 12 controls the optical output level of the optical amplifier 1 by adjusting the excitation light irradiated from the irradiation unit 7 to the optical amplification unit 4 based on the number of detected wavelengths.

The optical amplifier 1 shown in FIG. 1 schematically represents a configuration for detecting the number of wavelengths (the number of channels) included in the signal light of the optical amplification unit 1 by using the evanescent light.

Since the amplification control of the optical amplifier 1 is well-known to those skilled in the art, the detail explanation of the detection method of the signal light level in the optical detection unit 6 and the like are omitted in this explanation.

Further, in the present exemplary embodiment, the optical amplifier 1 has a single stage of optical amplification unit 4. However, plural stages of optical amplification units 4 may be arranged for the amplification control for increasing the gain of the signal light.

Further, an optical device for keeping the quality of the optical signal (for example, an optical signal gain equalizer, an optical diffusion compensator and the like) may be mounted on the optical amplifier 1, although it is not shown in FIG. 1.

Moreover, in the present exemplary embodiment, the branching unit 5 is arranged near the waveguide path 8 on the output side of the optical amplification unit 4. However, the branching unit 5 may be arranged on an input side of the optical amplification unit 4 or on a waveguide path 8 which is apart from the neighbor of the output side of the optical amplification unit 4.

In a case where a prism is adopted for the branching unit 5, the distance between the prism and the optical fiber for detecting the evanescent light is generally between tens of nanometers and hundreds of nanometers. However, the distance is not limited as long as the evanescent light can be detected.

For the optical detection unit 6, though a photodiode is generally used, any elements which can perform the photoelectric conversion may be adopted.

The number of required photodiodes is same to the number of channels included in the signal light. However, in FIG. 1, only one photodiode is schematically represented, because the number of channels is different dependently on the adopted optical wavelength division multiplexing communication system. The number of required waveguide paths connecting the branching unit 5 and the optical detection unit 6 is same to that of the optical detection units, though the material, structure, and the like are not restricted.

For the wavelength detection unit 11, though an analogue-digital integrated circuit using CPU, A/D converter and the like is generally used, any configuration which can receive an electric signal outputted from the optical detection unit 6 and count it may be adopted.

Explanation of Operation Method

Figure 2:
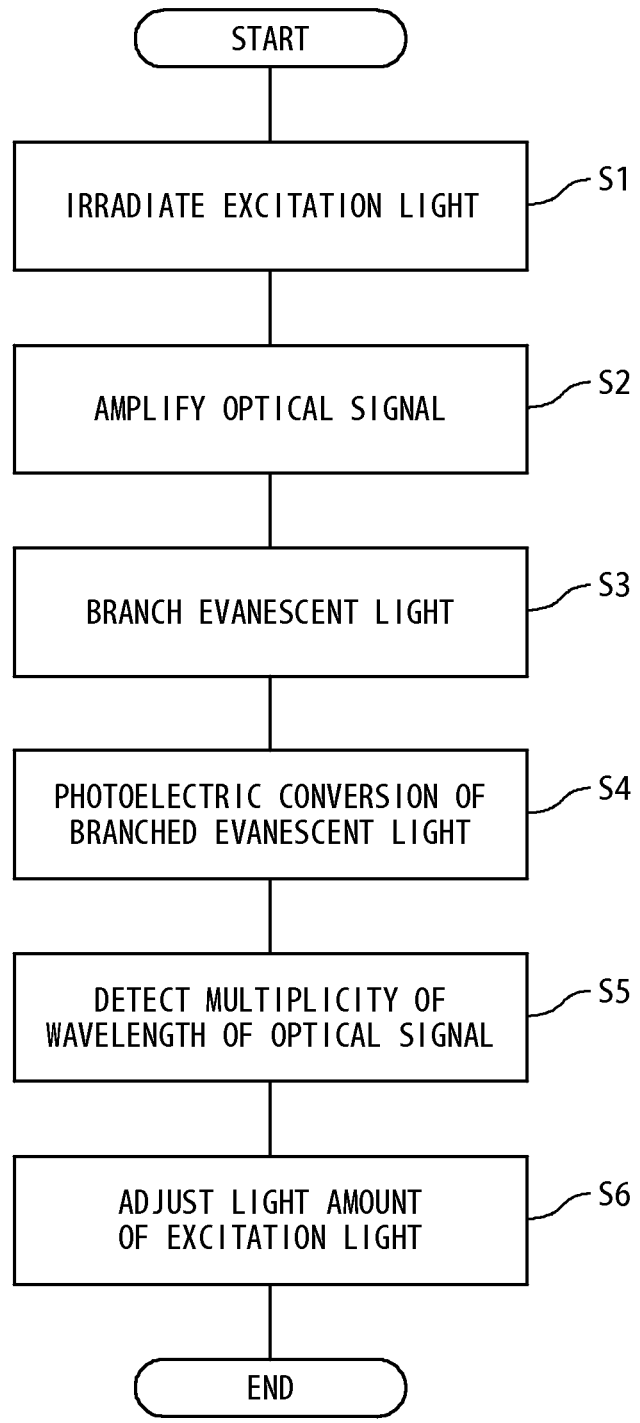
FIG. 2 is a flowchart of an optical amplification method in the optical amplifier 1 according to the first exemplary embodiment of the present invention.

Next, an optical amplification method of the optical amplifier 1 according to the present exemplary embodiment is explained. FIG. 2 is a flowchart showing an optical amplification method of the optical amplifier 1 according to the first exemplary embodiment of the present invention.

(Step S1)

The irradiation unit 7 irradiates an excitation light to the optical amplification unit 4.

(Step S2)

The optical amplification unit 4 amplifies a signal light inputted from the optical connector 2 by the excitation light.

(Step S3)

The optical signal amplified by the optical amplification unit 4 passes through the waveguide path 8 and is outputted from the optical connector 3. The branching unit 5 focuses the evanescent light, being the optical signal outputted from the optical amplification unit 4 to the waveguide path 8 and leaked to outside the waveguide path 8, on the optical detection unit 6.

Figure 3:
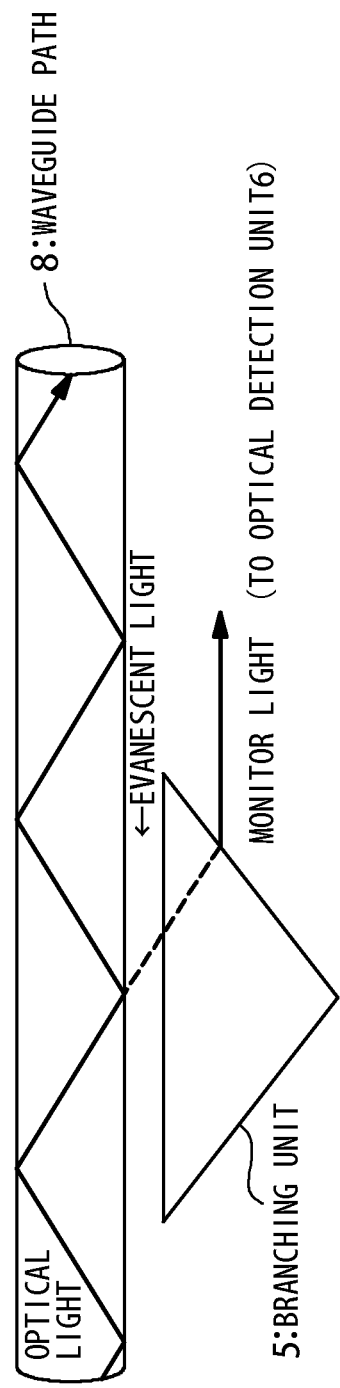
FIG. 3 is a view for explaining the mechanism of detecting the evanescent light in the optical amplifier 1 according to the first exemplary embodiment of the present invention.

FIG. 3 is a view for explaining a mechanism for detecting the evanescent light in the optical amplifier 1 according to the first exemplary embodiment of the present invention. At first, the evanescent light is explained. In a case where a signal light is entered from medium whose refractive index is high (inside the fiber core) to medium whose refractive index is low (outside the fiber core), the signal light is totally reflected when the incident angle is a certain critical angle or larger. In such a case, about one wavelength light is leaked to the low medium side. This leaked light is the evanescent light. Though the evanescent light has a wavelength being same with the signal light, since it is leaked only about one wavelength, it exists only in a distance between some tens of nanometers and some hundreds of nanometers in the vertical direction from the fiber core generally. Therefore, for detecting the evanescent light, it is required for the branching unit 5 to be arranged in a distance between some tens of nanometers and some hundreds of nanometers from the fiber core. The wavelength components included in the evanescent light are branched by the branching unit 5 and the branched optical signal is detected by the optical detection unit 6. Then, it is required to prepare optical detection units 6 whose number is same with the number of maximum channels in use of the adopted optical wavelength division multiplexing system. In the optical amplifier 1 shown in FIG. 1, because the mechanism of amplifying the signal light using the evanescent light is represented only schematically, so that only one optical detection unit 6 is described.

(Step S4)

The optical detection unit 6 detects the evanescent light and creates an electric signal which corresponds to the detected evanescent light. The optical detection unit 6 detects whether each wavelength component of the signal light outputted from the branching unit 5 exists or not.

(Step S5)

The wavelength detection unit 11 detects the multiplicity of the wavelengths of the optical signal by detecting and counting the number of electric signals received from the optical detection unit 6.

(Step S6)

The optical amount adjustment unit 12 adjusts the optical amount of the irradiation unit 7 based on the multiplicity of the wavelengths detected at STEP S5.

According to the first exemplary embodiment of the present invention, the number of wavelengths (the number of channels) included in a signal light can be detected without adding an optical coupler arranged on the waveguide path of the optical amplifier and the like. Further, since the evanescent light exists in any portion of the waveguide path, it is possible to detect the number of wavelengths (the number of channels) included in the signal light at any portion of the waveguide path 8.

Second Exemplary Embodiment

Explanation of Structure

Figure 4:
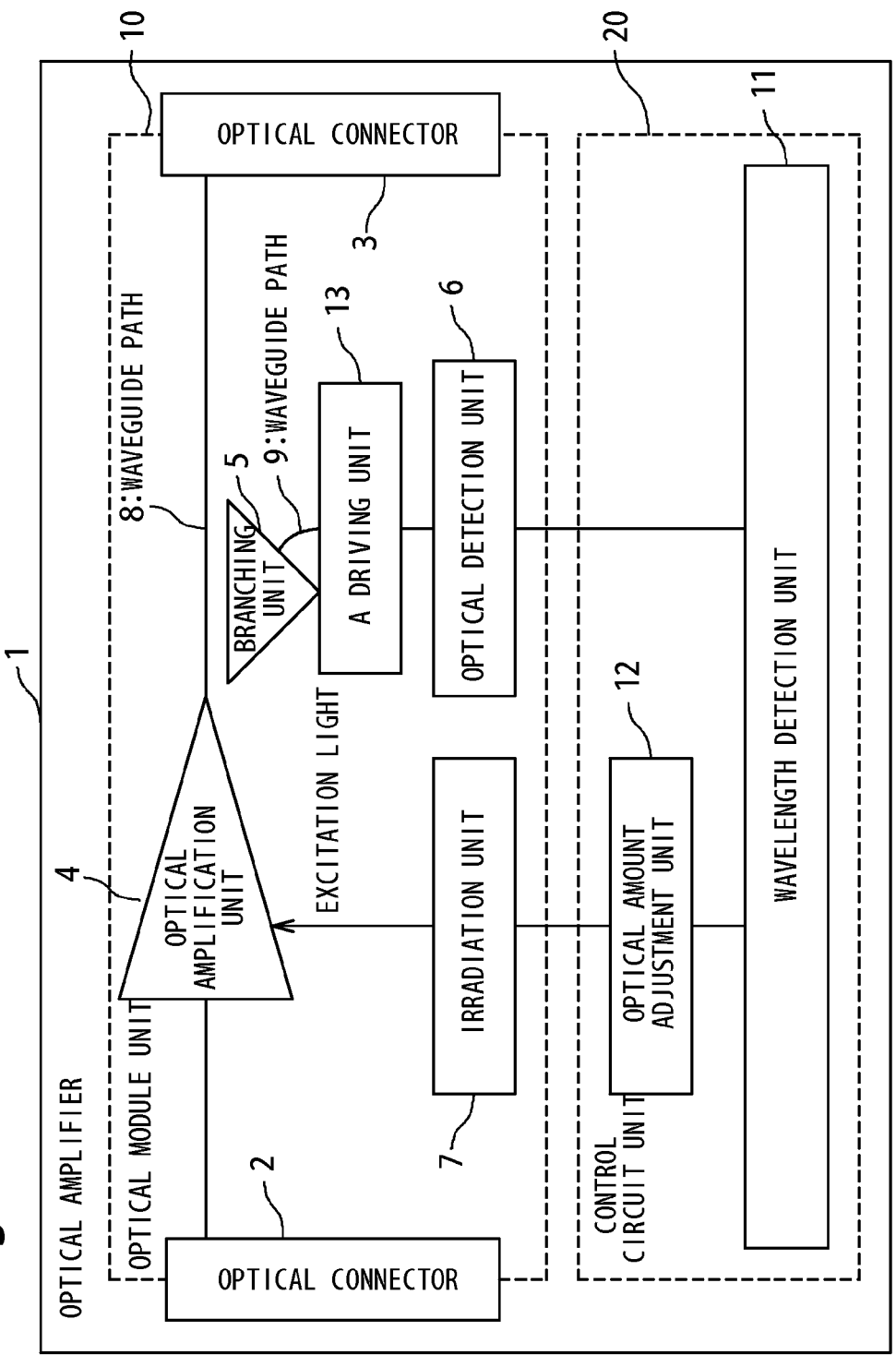
FIG. 4 is a structural view of an optical amplifier 1 according to a second exemplary embodiment of the present invention.

At first, a structure of an optical amplifier according to the present exemplary embodiment is explained below. FIG. 4 is a structural view of the optical amplifier 1 according to the second exemplary embodiment of the present invention. The optical amplifier 1 according to the present exemplary embodiment includes an optical module unit 10 and a control circuit unit 20. The optical module unit 10 includes: an optical connector 2; an optical connector 3; an optical amplification unit 4; a branching unit 5; an optical detection unit 6; an irradiation unit 7; a waveguide path 8; a waveguide path 9; and a driving unit 13. The control circuit unit 20 includes a wavelength detection unit 11 and an optical amount adjustment unit 12. The structure of the optical amplifier 1 according to the present exemplary embodiment is different from that of the first exemplary embodiment of the present invention in that the position of the branching unit 5 is changeable by the driving unit 13.

The driving unit 13 moves the branching unit 5 in a direction parallel to the waveguide path 8. In the first exemplary embodiment of the present invention, the evanescent light is detected at one point (which is desirably set depending on design) of the waveguide path 8 of the output side of the optical amplification unit 4. However, dependently on the material or the propagation mode of the waveguide path 8, the signal light may become broad, so that there is a possibility that the wavelength components included in the signal light cannot be detected at the one point. Then, by moving the branching unit 5 in the direction parallel to the waveguide path 8 by the driving unit 13, the wavelength components of the signal light which cannot be detected at the one point are detected. The driving unit 13 is driven by a motor generally, and each of the moving distance and the speed of the branching unit 5 can be determined to an appropriate value for detecting the number of wavelengths (the number of channels) of the signal light correctly by a person skilled in the art.

Therefore, the specific numerical values of the moving distance and the speed are omitted from this explanation.

Explanation of Operation Method

Next, an optical amplification method in the optical amplifier 1 according to the present exemplary embodiment is explained. The flowchart of the optical amplification method according to the present exemplary embodiment is same with that of the first exemplary embodiment shown in FIG. 2. However, in STEP S3, the present exemplary embodiment is different from the first exemplary embodiment in that the branching of the evanescent light is performed by moving the branching unit 5 to an appropriate position by the driving unit 13.

Figure 5:
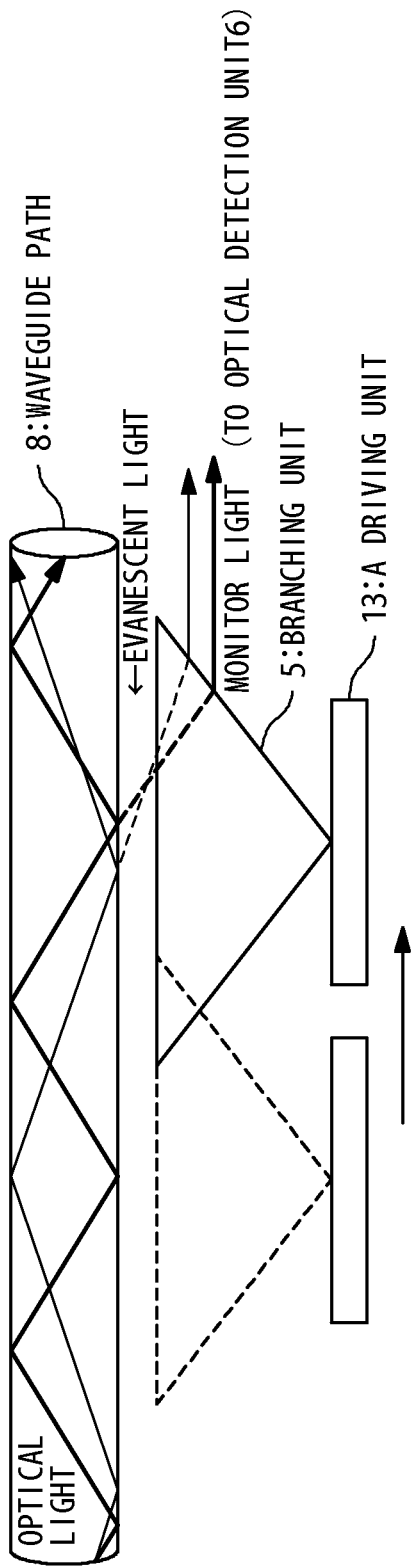
FIG. 5 is a view for explaining a mechanism of detecting the evanescent light in the optical amplifier 1 according to the second exemplary embodiment of the present invention.

FIG. 5 is a view for explaining the mechanism to detect the evanescent light in the optical amplifier 1 according to the second exemplary embodiment of the present invention. According to the optical amplifier 1 of the second exemplary embodiment of the present invention, the branching of the evanescent light can be performed at an appropriate position by moving the branching unit 5 in a direction parallel to the wavelength path 8.

In the above, some exemplary embodiments of the present invention are explained with reference to the accompanying drawings. However, the present invention is not limited to the above-explained exemplary embodiments, and can be appropriately modified by those skilled in the art within a scope which does not deviate from the intent.

What is claimed is:

1. An optical amplifier comprising:
a waveguide path configured to transmit an optical signal;
an optical amplification unit formed on the waveguide path and configured to amplify the optical signal by an excitation light;
an irradiation unit configured to irradiate the excitation light to the optical amplification unit;
an optical detection unit configured to detect a light and generate an electric signal which corresponds to the detected light;
a branching unit configured to branch an evanescent light being the optical signal outputted from the optical amplification unit to the waveguide path and leaked outside the waveguide path, and focus the evanescent light on the optical detection unit;
a wavelength detection unit configured to detect a wavelength multiplicity of the optical signal based on the evanescent light detected by the optical detection unit; and
a light amount adjustment unit configured to adjust a light amount of the excitation light irradiated by the irradiation unit based on the wavelength multiplicity.

2. The optical amplifier according to claim 1, further comprising:
a driving unit configured to move the branching unit along the waveguide path.

3. The optical amplifier according to claim 1, wherein the optical amplification unit is an erbium doped fiber,
wherein the irradiation unit is a laser diode, and
the optical detection unit is a photodiode.

4. The optical amplifier according to claim 1, wherein the branching unit is a prism.

5. The optical amplifier according to claim 1, wherein the branching unit is a diffraction grating.

6. An optical amplifying method comprising:

amplifying an optical signal which transmits through a waveguide path by an excitation light by an optical amplification unit formed on the waveguide path;

irradiating the excitation light to the optical amplification unit;

detecting a light and generate an electric signal which corresponds to the detected light by an optical detection unit;

branching an evanescent light being the optical signal outputted from the optical amplification unit to the waveguide path and leaked outside the waveguide path;

focusing the evanescent light on the optical detection unit;

detecting a wavelength multiplicity of the optical signal based on the evanescent light detected by the optical detection unit; and adjusting a light amount of the excitation light irradiated by the irradiation unit based on the wavelength multiplicity.

7. The optical amplifying method according to claim 6, further comprising:

moving the branching unit along the waveguide path.

* * * * *